United States Patent [19]
Horiuchi et al.

[11] Patent Number: 5,539,557
[45] Date of Patent: Jul. 23, 1996

[54] SUPERVISORY SIGNAL RECEIVING METHOD AND APPARATUS

[75] Inventors: Yukio Horiuchi, Niza; Hiroharu Wakabayashi, Kawasaki; Shigeyuki Akiba, Tokyo; Shu Yamamoto, Shiki, all of Japan

[73] Assignee: Kokusai Denshin Denwa Kabushiki Kaisha, Tokyo, Japan

[21] Appl. No.: 343,528

[22] PCT Filed: Apr. 20, 1994

[86] PCT No.: PCT/JP94/00653

§ 371 Date: Nov. 17, 1994

§ 102(e) Date: Nov. 17, 1994

[87] PCT Pub. No.: WO94/24779

PCT Pub. Date: Oct. 27, 1994

[30] Foreign Application Priority Data

Apr. 21, 1993 [JP] Japan ..................... 5-116668

[51] Int. Cl.⁶ ................................. H04B 10/08
[52] U.S. Cl. ................. 359/110; 359/161; 359/189
[58] Field of Search ..................... 359/110, 158, 359/161, 174, 177, 189; 375/211; 370/74–75

[56] References Cited

U.S. PATENT DOCUMENTS 5,293,260 3/1994 Kikawa et al. ............... 359/174

5,383,046 1/1995 Tomofuji et al. ............... 359/110

FOREIGN PATENT DOCUMENTS 59-225636 12/1984 Japan.
63-72228 4/1988 Japan.

*Primary Examiner*—Leo Boudreau
*Assistant Examiner*—Kinfe-Michael Negash
*Attorney, Agent, or Firm*—Emmanuel J. Lobato

[57] ABSTRACT

At the time of receiving a repeater supervisory signal superimposed on or combined by wavelength multiplexing with a main optical signal in an optical amplifier repeater system, the received optical signal is subjected to a photoelectric conversion by a photodetector and then branched into two electric signals, the one of which is subjected to equalizing amplification, timing extraction and discrimination and regeneration to extract only the main signal component. The main signal component thus extracted and the main signal contained in the other electric signal, which is not regenerated, are respectively subjected to required equalization, delay adjustment and amplitude adjustment so that they match with one another in waveform, phase and amplitude. In addition, the amplitude adjustment of the main signal is automatically controlled. By differentially combining these signals to remove only the main signal component to minimize its residual value, thereby extracting the supervisory signal to be obtained.

3 Claims, 6 Drawing Sheets

1

SUPERVISORY SIGNAL RECEIVING METHOD AND APPARATUS

TECHNICAL FIELD

The present invention relates to a method and apparatus for receiving a repeater supervisory signal which is transmitted while being superimposed on a main optical signal in an optical amplifier repeater system.

BACKGROUND OF THE INVENTION

To transmit an optical repeater supervisory signal in an optical amplifier repeater system to the end office side, there have been proposed the following systems which superimpose the supervisory signal on the main optical signal to such an extent as not to affect the main signal.

(1) System which superimposes the supervisory signal on the envelope of the main optical signal with a low modulation depth. (For example, Japanese Pat. Laid-Open No. 119328/90, "Optical Repeater Supervisory Control System")

(2) System which superimposes the supervisory signal on the main optical signal, using an optical signal of a wavelength different from that of the main optical signal.

The repeater supervisory signal is superimposed on the main optical signal and the both signals are received simultaneously; when the supervisory signal is received at the end office, the main signal is also received. Consequently, the signal spectrum of the supervisory signal after photoelectric conversion overlaps the power spectrum of the main signal, and since the supervisory signal is superimposed on the main signal at such an extremely low level as not to exert any influence on the main signal, the main signal component becomes noise when the supervisory signal is received; hence, it is difficult to receive the supervisory signal with a sufficient signal power vs. noise power ratio (SNR).

The inventors of this application has proposed a solution to this problem in Japanese Pat. Appln. No. 337902/92, entitled "Supervisory Signal Receiving Method and Apparatus." However, the method and apparatus proposed in the prior application are defective in that the function of keeping the main signal component at minimum at all times is somewhat poor.

An object of the present invention is to provide a supervisory signal receiving method and apparatus which ensure stable and reliable supervision of repeaters by receiving the repeater supervisory signal with a higher SN ratio in the optical amplifier repeater system.

DISCLOSURE OF THE INVENTION

To solve the above problem, according to the present invention, the received repeater supervisory signal, superimposed on or combined by wavelength multiplexing with the main optical signal of the optical amplifier repeater system, is subjected to a photoelectric conversion and then branched into two electric signals, the one of which is subjected to equalizing amplification, timing extraction and discrimination and regeneration to extract only the main signal component. The thus extracted main signal component and the main signal contained in the other electric signal which is not discriminated nor regenerated are respectively subjected to required equalization, delay adjustment and amplitude adjustment so that their waveforms, phases and amplitudes match with each other. In addition, the amplitude adjustment of the main signal is automatically controlled. By differentially combining these signals to remove only the main signal component in a manner to minimize its residual value, thereby extracting the supervisory signal desired to obtain.

Thus, according to the present invention, the received optical signal having the supervisory signal superimposed on the main optical signal is differentially combined with the main optical signal component to effectively remove the main optical signal component from the received optical signal, thereby extracting the supervisory signal.

DETAILED DESCRIPTION OF THE BACKGROUND

To facilitate a better understanding of the present invention, a description will be given first of the background art.

With the afore-mentioned conventional systems, it is unavoidable that the supervisory signal component after photo-electric conversion in the end office overlaps the main signal component. Since both conventional supervisory signal receiving apparatus are exactly identical in construction with each other, a description will be given of the system (1) alone.

Figure 5:
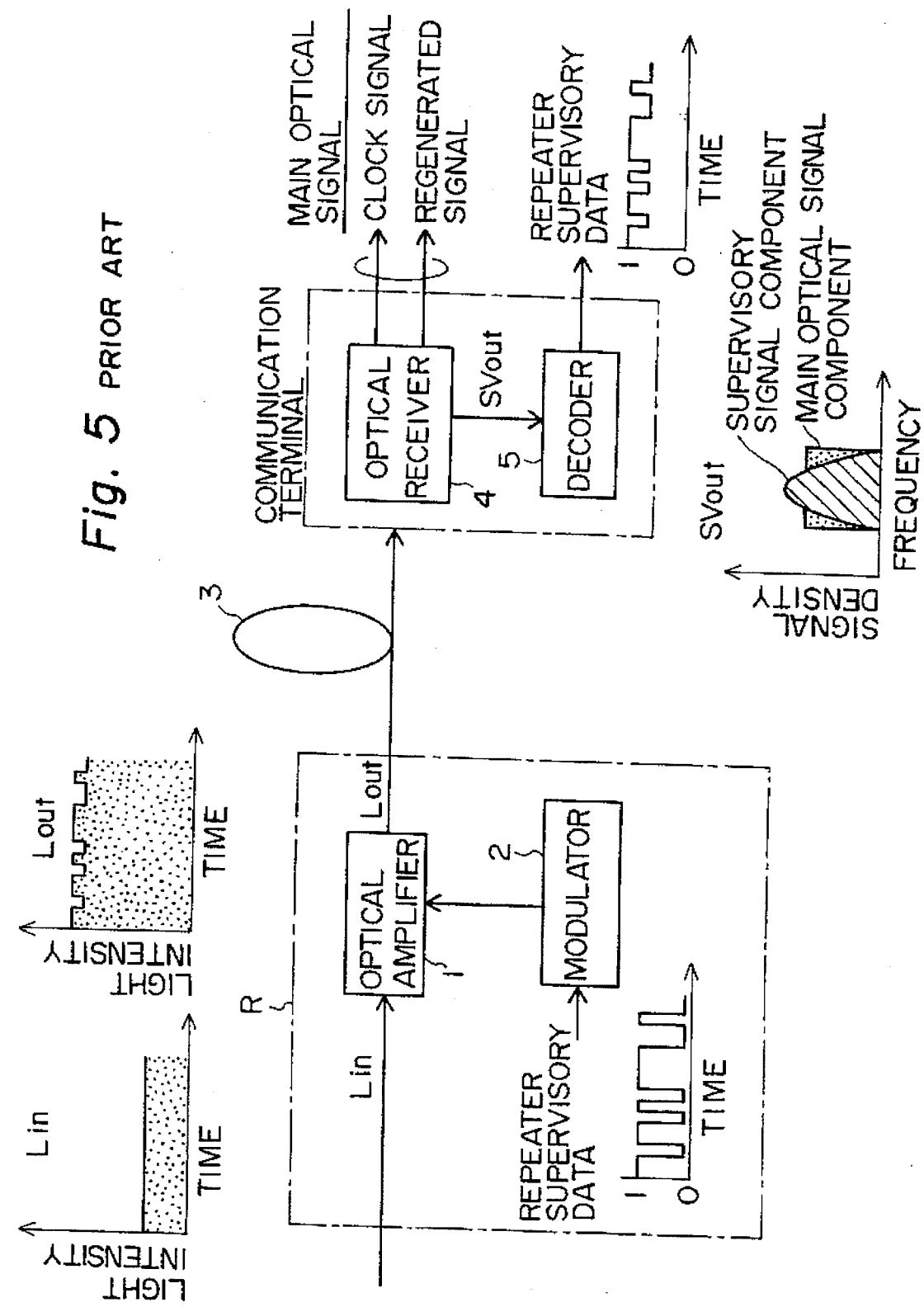
FIG. 5 is a block diagram showing a conventional repeater supervisory signal transmitting method by which the supervisory signal is superimposed on the envelope of the main optical signal with a low degree of modulation and transmitted to a communication end office.
Figure 6:
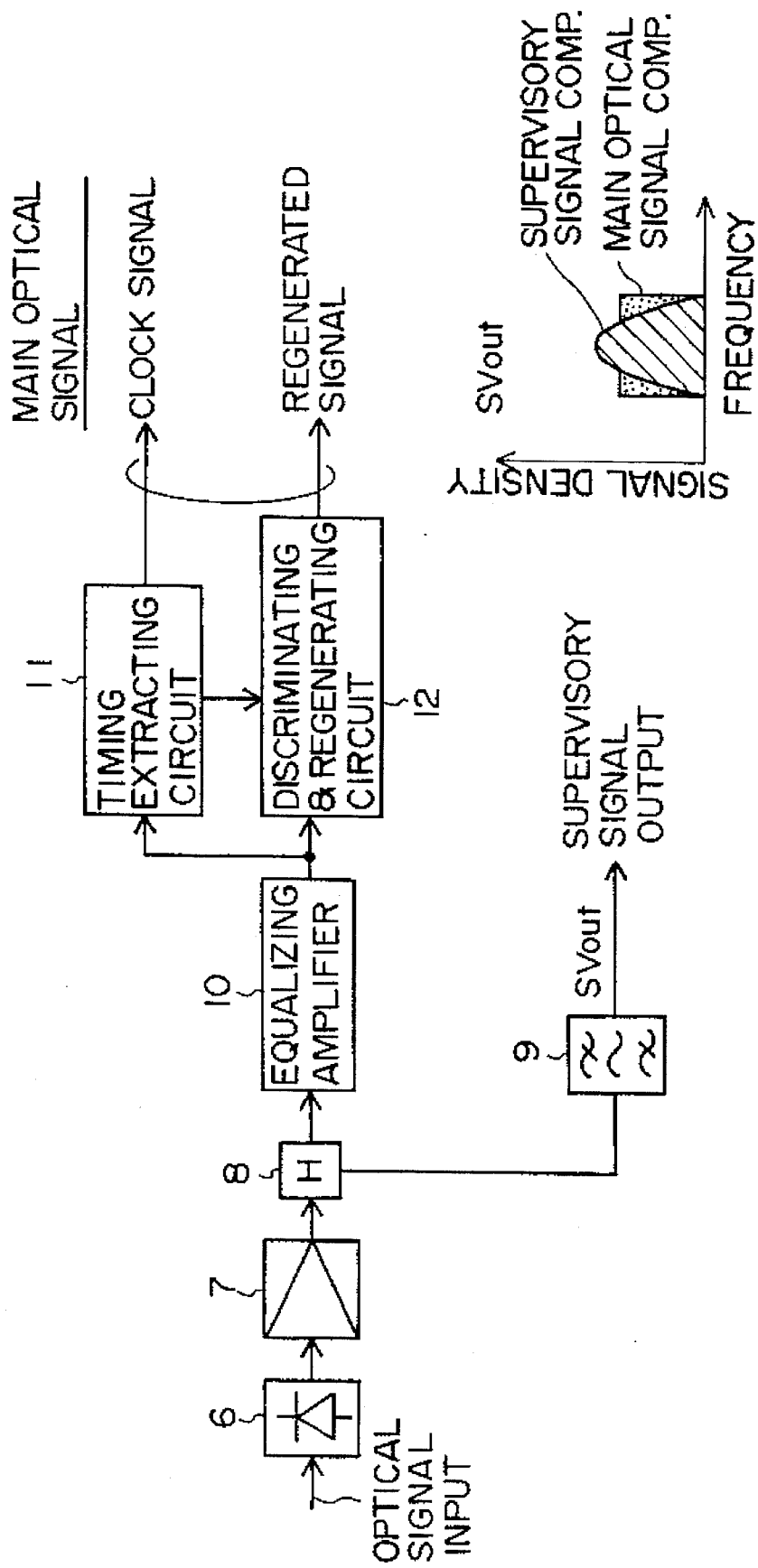
FIG. 6 is a block diagram of a conventional supervisory signal receiving apparatus.

FIG. 5 is a block diagram showing the repeater supervisory signal transmission of the system (1), including a repeater and an end office. FIG. 6 is a block diagram of a supervisory signal receiving device for use in an optical receiver 4.

In FIG. 5, reference character R denotes an optical repeater, 1 an optical amplifier, 2 a modulator for converting repeater supervisory data into a modulated signal which can be superimposed on the main optical signal passing through the optical amplifier 1, 3 an optical fiber which is a transmission medium for the optical signal, 4 an optical receiver for receiving the main signal and the supervisory signal, and 5 a detector which detects the supervisory signal resulting from photoelectric conversion in the optical receiver 4. The repeater supervisory data, which includes respective operation parameters in the repeater R, is converted by the modulator 2 to an amplitude-modulated or similar modulated signal. This modulated signal is used to control the amplification gain of the amplifier 1, by which the modulated signal is superimposed on the envelope of the main optical signal. In FIG. 5, the main optical signal Lin input into the repeater R is amplified by the amplifier 1, while at the same time the modulated signal containing the repeater supervisory data is superimposed on the envelope of the main optical signal; thus, the optical amplifier 1 outputs a main optical signal Lout.

The gain control of the optical amplifier 1 can be effected by a known method; for example, in the case of an optical amplifier using an Er-doped optical fiber, which is now regarded as a promising optical amplifier, the output power or drive current of its exciting light source is controlled. Since the optical amplifier using the Er-doped optical fiber inhibits the passage therethrough of a modulated signal of a frequency below several kHz owing to its frequency response characteristic, the repeater supervisory data cannot directly be superimposed on the envelope of the main optical signal. It is therefore necessary to transmit the repeater supervisory data after conversion into a modulated signal of a carrier frequency which is allowed to pass through the optical amplifier. In FIG. 5, no "behavior" of the carrier is shown in the interests of clarify and better understanding of the description. Furthermore, it is important that the degree of modulation with which the supervisory data is superimposed on the envelope of the main optical signal be so low as not to affect the transmission characteristic of the main optical signal.

The main optical signal Lout transmitted over the optical fiber 3 and received by the optical receiver 4 of the end office is subjected to a photoelectric conversion and then branched into two electric signals, the one of which is applied as a supervisory signal SVout to and band limited by a band-pass filter of a frequency containing the supervisory signal component, thereafter being applied to the detector 5. The modulated signal, amplitude-modulated by the modulator 2 of the repeater R, is demodulated by the detector into the repeater supervisory data.

The function of the optical receiver 4 will be described in more detail. In FIG. 6, reference numeral 6 denotes a photo-detector for converting an optical signal to an electric signal, 7 a first-stage amplifier for amplifying the electric signal output from the photodetector 6, 8 an electric signal brancher for branching the output from the first-stage amplifier 7 into two electric signals, and 9 a band-pass filter for extracting the supervisory signal. This construction is the same as that for the demodulation of the above-mentioned repeater supervisory data. In the main signal regenerating system, reference numeral 10 denotes an equalizing amplifier which amplifiers one of the electric signals branched by the electric signal brancher 8 and shapes the waveform of the main signal, 11 a timing extracting circuit for extracting the pulse repetition frequency component or a timing signal of the main signal, and 12 a discriminating and regenerating circuit which determines whether the main signal waveform-shaped by the equalizing amplifier 10 is a "1" or "0" and regenerates the main signal. Thus, the main signal is waveform shaped by the equalizing amplifier 10 and branched into two electric signals, the one of which is provided to the timing extracting circuit 11 to extract the pulse repetition frequency component or timing signal (a clock signal). The other electric signal is fed to the discriminating and regenerating circuit 12, wherein it is determined whether the signal is a "1" or "0" on the basis of the above-mentioned timing signal and a predetermined threshold value, thereby regenerating the main signal deteriorated in waveform during transmission over the transmission line such as the repeater R and the optical fiber 3.

BEST MODE OF THE INVENTION

Figure 1:
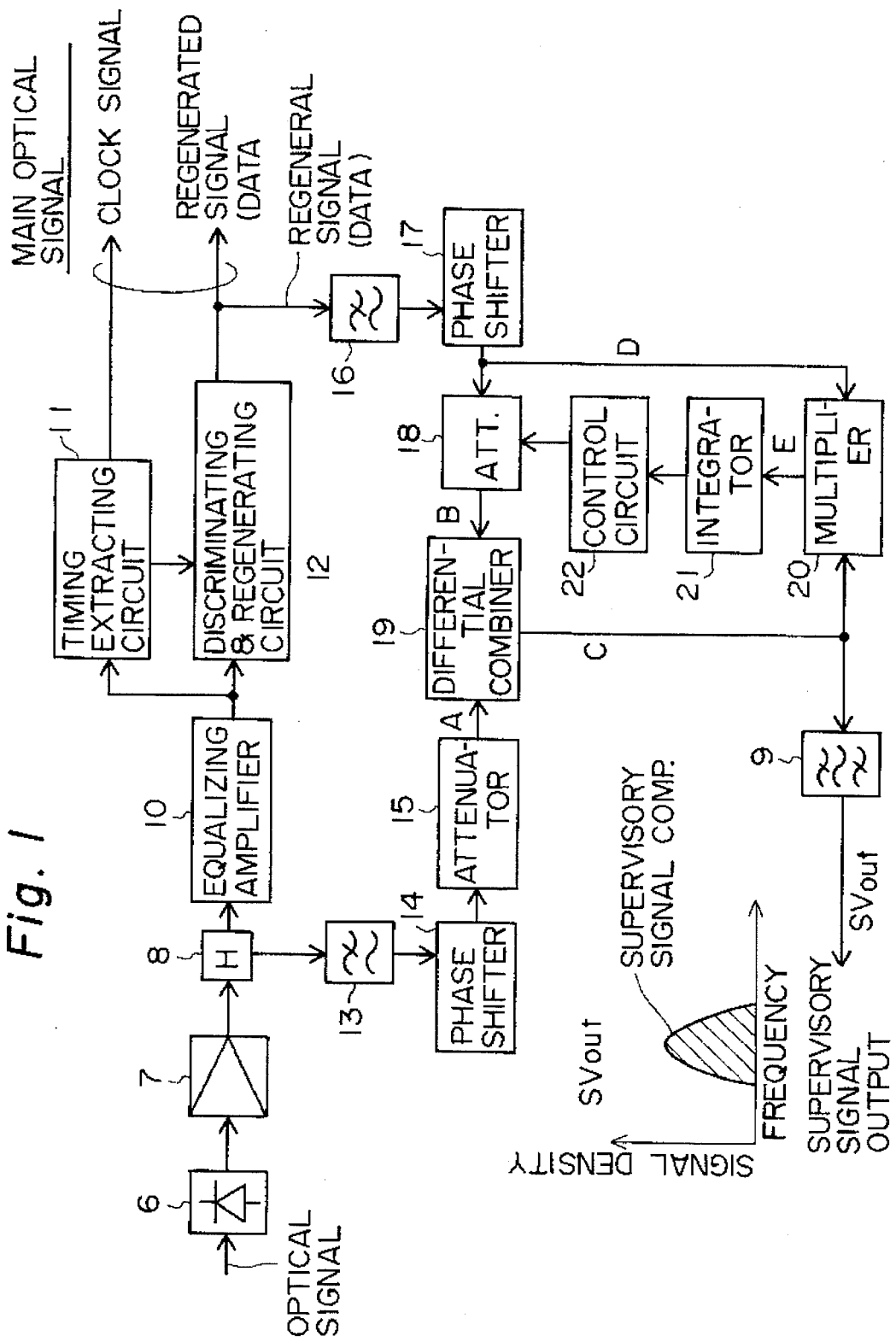
FIG. 1 is a block diagram of the supervisory signal receiving apparatus according to a first embodiment of the present invention.

FIG. 1 illustrates in block form the supervisory signal receiving apparatus according to a first embodiment of the present invention. The parts corresponding to those in the prior art example of FIG. 6 are identified by the same reference numerals. In FIG. 1, reference numeral 6 denotes a photodetector for converting an optical signal to an electric signal, 7 a first-stage amplifier for amplifying the electric signal output from the photodetector 6, 8 an electric signal brancher for branching the output from the first-stage amplifier 7 into two electric signals, and 9 a band-pass filter for extracting the supervisory signal. Reference numeral 10 denotes an equalizing amplifier which amplifies one of the electric signals branched by the electric signal brancher 8 and waveform shapes the main signal, 11 a timing extracting circuit which extracts the pulse repetition frequency component or a timing signal of the main signal, 12 a discriminating and regenerating circuit which is formed by a flip-flop for determining whether the main signal waveform-shaped by the equalizing amplifier 10 is a "1" or "0" and for regenerating the main signal by the timing signal from the timing signal extracting circuit 11, 13 a low-pass filter which equalizes the frequency component of the main signal for its waveform shaping, 14 a phase shifter for adjusting the phase of the main signal component, 15 an attenuator for adjusting the amplitude of the main signal component, 16 a low-pass filter which equalizes the frequency component of a regenerated signal from the discriminating and regenerating circuit 12 to its waveform shaping, 17 a phase shifter for adjusting the phase of the regenerated signal from the discriminating and regenerating circuit 12, 18 an attenuator for adjusting the amplitude of the regenerated signal, 19 a differential combiner for combining the outputs from the attenuators 15 and 18, 20 a multiplier for multiplying the outputs from the phase shifter 17 and the differential combiner 19, 21 an integrator which integrates the output from the multiplier 20 to obtain a gain and determine a time constant, and 22 a control circuit which controls the attenuation of the attenuator 18 in accordance with the polarity and intensity of the output signal from the integrator 21.

The main optical signal with the repeater supervisory signal superimposed thereon is converted by the photodetector 6 into an electric signal, which is amplified by the first-stage amplifier 7 and then branched by the electric signal brancher 8 into a supervisory signal output and a main signal output. In the equalizing amplifier 10 the main signal waveform-distorted in the optical amplifier repeater system is amplified and waveform shaped; in the timing extracting circuit 11 a timing signal of the main signal is extracted; in the discriminating and regenerating circuit 12, it is determined whether the waveform-shaped main signal is a "1" or "0" and it is regenerated as a new digital signal on the basis of the timing signal. This regenerated signal is provided for a communication service. The discriminating and regenerating circuit 12 usually has two output terminals for the regenerated signal and its inverted version. This embodiment uses the non-inverted regenerated signal.

To remove the main signal component from the supervisory signal output, the regenerated signal with no supervisory signal component and the other branched electric signal containing the supervisory signal component are differentially combined after having their main signal components made identical in waveform, phase and amplitude with each other, by which the main signal contained in the non-regenerated signal containing the supervisory signal component is cancelled. In this way, the main signal component can easily be removed from the supervisory signal output. In this instance, the regenerated signal output needs to be identical in the polarity of waveform with the non-regenerated signal.

The non-regenerated signal containing the supervisory signal component is waveform shaped by the low-pass filter 13 and fed to the differential combiner 19 via the phase shifter 14 and the attenuator 15. The regenerated signal with no supervisory signal component, which is a regenerated signal from the discriminating and regenerating circuit 12, is waveform shaped by the low-pass filter 16 and then fed to the differential combiner 19 via the phase shifter 17 and the attenuator 18. Since these two signals have been adjusted to be identical in their waveform, phase and amplitude, they are differentially combined by the differential combiner 19 to cause their main signal components to cancel each other out, outputting the supervisory signal alone.

Figure 2:
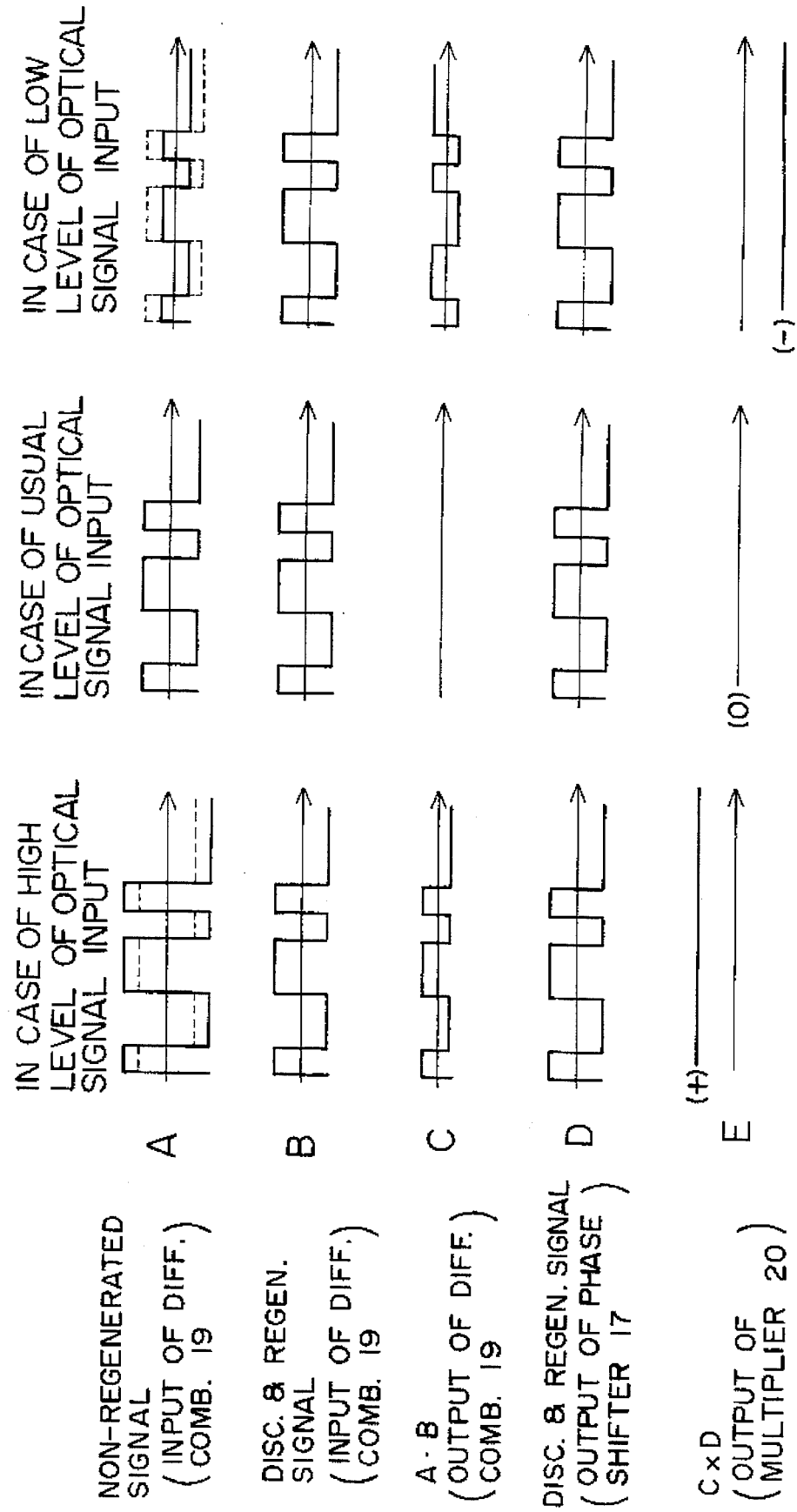
FIG. 2 is a timing chart showing variations of signals at respective parts of the supervisory signal receiving apparatus of the present invention which are caused by intensity variations of the optical input signal thereinto.

FIG. 2 shows variations of signals at respective parts of the supervisory signal receiving apparatus of the present invention which are caused by intensity variations of the optical signal input thereinto. When the intensity of the input optical signal changes, the electric intensity of the non-regenerated signal changes as shown in FIG. 2A with the intensity of the input optical signal. On the other hand, since the intensity of the output signal from the discriminating and regenerating circuit is constant (FIG. 2B), if the attenuation value of the attenuator 18 is fixed, the amplitudes of the two signals cannot be matched to each other, with the result that the main signal component is not removed from the supervisory signal component but is output as shown in FIG. 2C, degrading the SN ratio at the time of receiving the supervisory signal. To avoid this, the output from the phase shifter 17 of a fixed amplitude (FIG. 2D) and the output from the differential combiner 19 (FIG. 2C) are multiplied in the multiplier 20 to obtain a correlation coefficient (FIG. 2E), which is integrated by the integrator 21 to control the integration gain and the time constant; by this, it is possible to obtain the correlation between the removed output signal and the main signal component and detect how much the main signal component remains unremoved in the removed output signal. Moreover, since the polarity and intensity of this correlation coefficient are represented as an amplitude ratio between the two signals which are applied to the differential combiner 19, this signal is used to control the attenuator 18 via the control circuit 22 to form a feedback loop, which is operated to minimize the main signal component, i.e. the correlation coefficient, at the output of the differential combiner 19, automatically matching the amplitudes of the two signals input thereinto. Thus, the SN ratio of the supervisory signal can be held excellent.

In the adjustment of the phase shifters 14 and 17, the main optical signal with no supervisory signal superimposed thereon is input into the photodetector 6, then the signal waveforms of the main signal components of the regenerated and non-regenerated signals are provided to an oscilloscope or like waveform observation device at the output point of the differential combiner 19, and the phase shifters 14 and 17 are roughly adjusted or controlled so that both signal waveforms become substantially identical in phase and in amplitude with each other. Furthermore, both signals are applied again to the differential combiner 19 and the phase shifters 14 and 17 are fine controlled or adjusted to minimize the power on a power meter or similar power observation device connected to the output of the band-pass filter 9. This minimizes the main signal component output and hence improves the SN ratio up to a maximum. Furthermore, the phase shifter of the signal system of the phase-lagging one of the both signals and the attenuator of the signal system of the smaller-amplitude signal can be adjusted or controlled by only the adjustment or control function of the other system; hence, even if they are omitted, the function of the system will not be impaired. Once the above-mentioned adjustment is effected, no further adjustment is needed, and consequently, it is also possible to use cables of the same phase shift amount in the phase adjustment and fixed attenuators in the amplitude adjustment.

Figure 3:
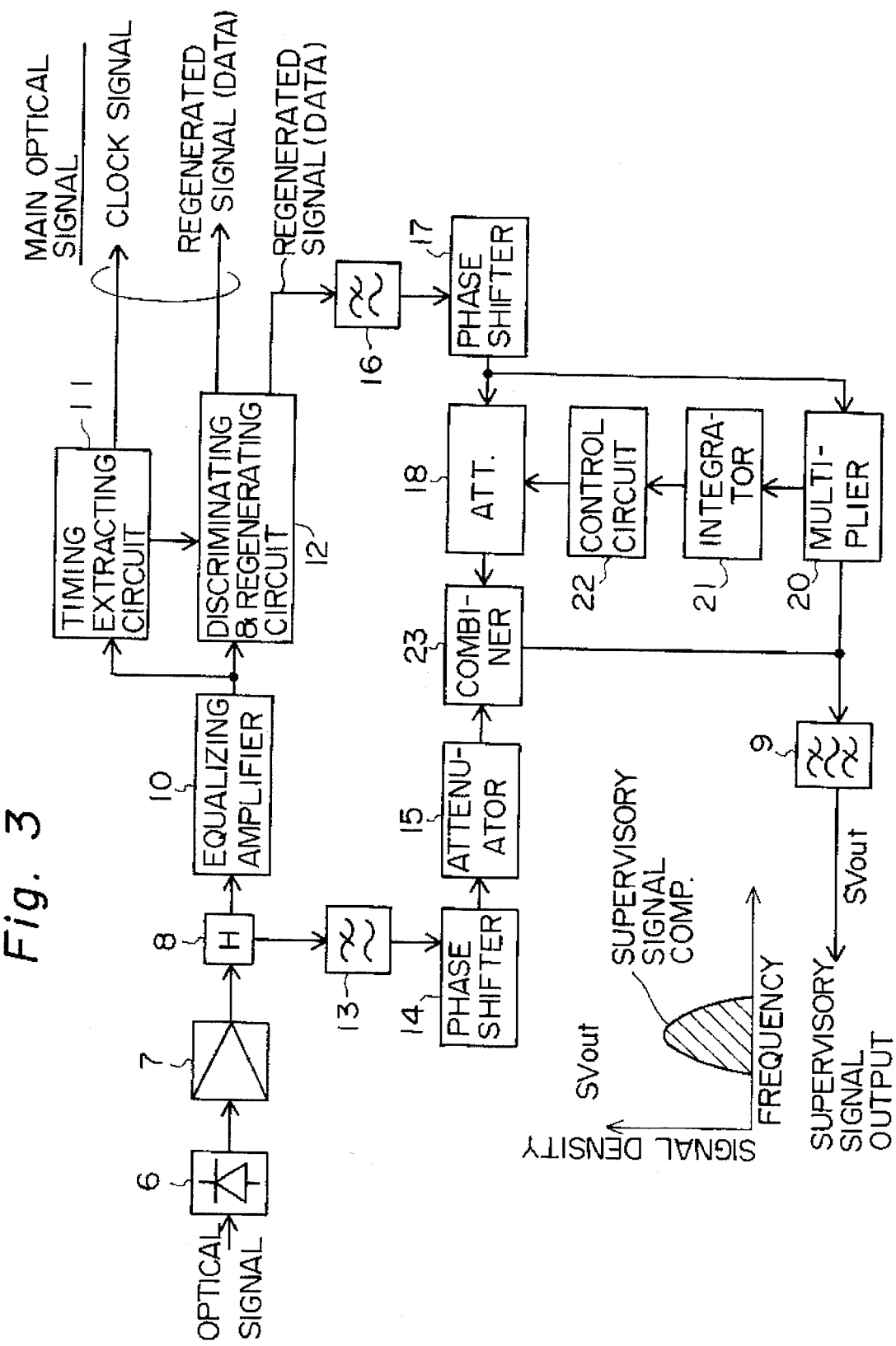
FIG. 3 is a block diagram of the supervisory signal receiving apparatus according to a second embodiment of the present invention.

FIG. 3 illustrates in block form the supervisory signal receiving apparatus according to a second embodiment of the present invention. The parts corresponding to those in Embodiment 1 are identified by the same reference numerals. This embodiment differs from Embodiment 1 in that the terminal at which the inverted version of the regenerated signal from the discriminating and regenerating circuit 12 is output is connected to the low-pass filter 16 and in that the differential combiner 19 is replaced with a combiner 23. Embodiment 2 is identical in its principles of operation with Embodiment 1, but the combiner 23 in Embodiment 2 does not need to use an active element, and hence is simple-structured and more reliable and more economical than the differential combiner 19 which needs to employ an active element. Accordingly, in this embodiment, the signal waveform of the output from the discriminating and regenerating circuit 12 is inverted unlike in Embodiment 1, that is, opposite in polarity to the non-regenerated signal. Since the discriminating and regenerating circuit 12 is formed by a flip-flop, the above-mentioned inverted signal can easily be obtained. Since the signal waveform of the regenerated output and the signal waveform of the non-regenerated output are already inverted relative to each other, the main signal component can be removed from the supervisory signal component by combining the signals by the combiner 23, not by the differential combiner 19. Incidentally, the constructions and methods for adjustments of the low-pass filters 13 and 16, the phase shifters 14 and 17 and the attenuators 15 and 18 are the same as those in Embodiment 1. Since the outputs from the multiplier 20 and the integrator 21 are inverted in polarity because of the inversion of the regenerated signal output, it is necessary to correct the inverted polarities of the outputs from the multiplier 20 and the integrator 21 by the control circuit 22.

The prior art examples and Embodiments 1 and 2 have been described with respect to the method for receiving the supervisory signal superimposed on the envelope of the main optical signal, but in the supervisory system for the optical amplifier repeater system using optical amplifiers, it is now contemplated to employ a method which transmits the supervisory signal through wavelength multiplexing by use of a signal of a wavelength different from that of the main optical signal as in the conventional system (2). Also in this case, the supervisory signal and the main optical signal are received at the same time; hence the supervisory signal receiving apparatus according to Embodiments 1 and 2 can be used.

While Embodiments 1 and 2 employ the low-pass filters 13 and 16 for shaping the afore-mentioned two signal waveforms, they are effective when the supervisory signal to be received needs to be high in frequency and wide in band; when the signal band of the supervisory signal is narrow, the use of a band-pass filter which permits the passage therethrough of only its frequency component allows ease in adjustment and permits efficient removal of the main signal component from the supervisory signal.

According to the present invention, the received optical signal is subjected to the photoelectric conversion and then branched into two electric signals, of which is subjected to equalizing amplification, timing extraction and discrimination and regeneration to thereby extract the main signal component, and to make identical the waveforms, phases and amplitudes of the above-said extracted main signal component and the main signal contained in the other electric signal which is not regenerated, required equalization, delay adjustment and amplitude adjustment are conducted in the respective signal paths, and both signals are differentially combined to remove the main signal component alone, thereby extracting the supervisory signal desired to obtain.

Figure 4:
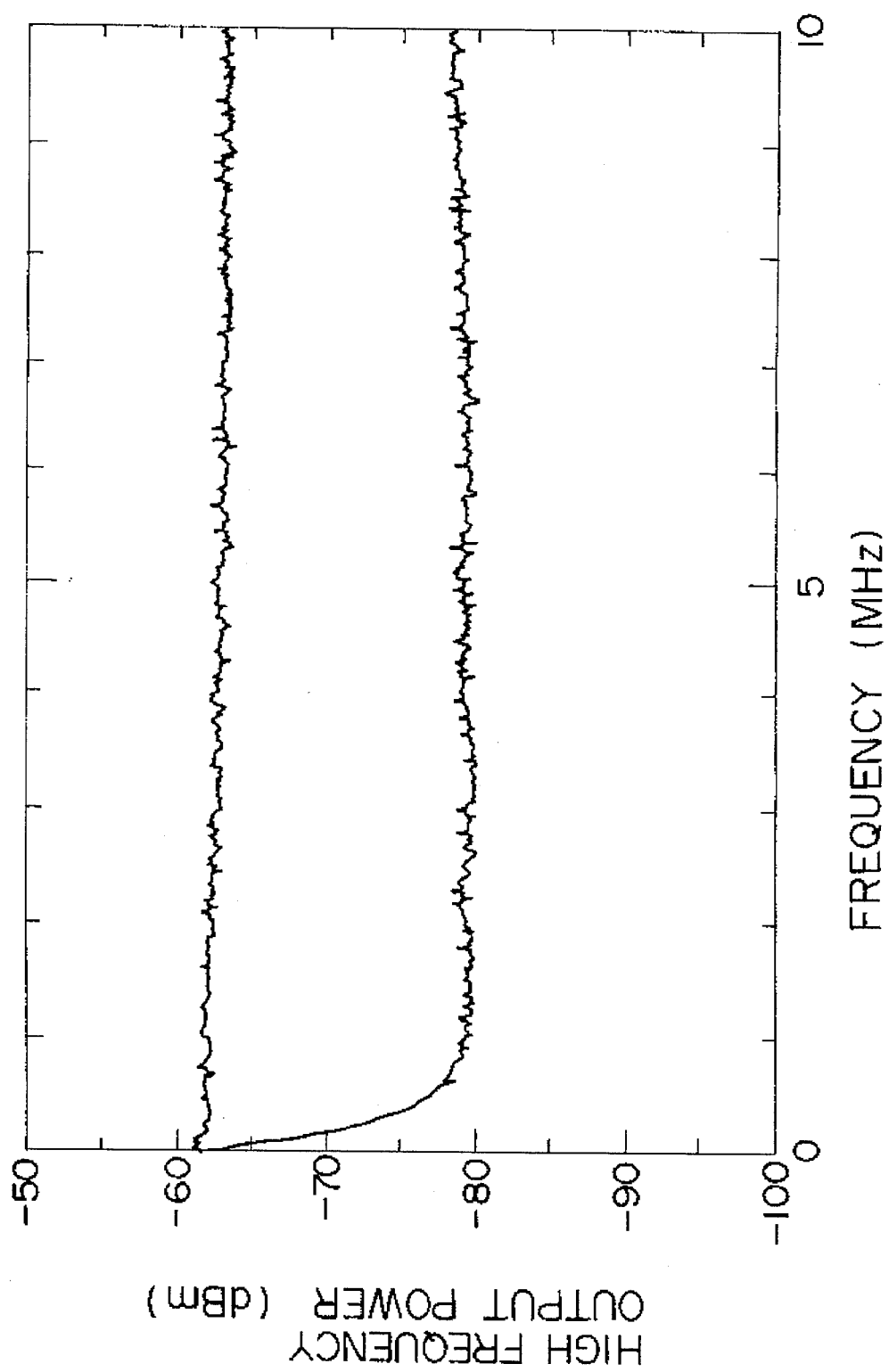
FIG. 4 is a graph showing measured results of improvement of the noise level caused by the main signal component in the supervisory signal receiving apparatus of the present invention.

FIG. 4 shows measured results of the noise level caused by the main signal component in the supervisory signal receiving apparatus according to the present invention. The supervisory signal receiving apparatus used is that of the embodiment of FIG. 3. The main signal components according to a conventional apparatus and this invention apparatus were measured for comparison, by using a 23-stage pseudorandom signal of a 5 Gbps transmission rate as the main signal component. The illustrated characteristics were obtained by observing the outputs of the combiner 23 with a spectrum analyzer and measuring the power intensities of the both main signal components. The measured waveform 1 shows a noise output by the conventional receiving apparatus and the measured waveform 2 a noise output by the receiving apparatus of the present invention. To obtain the same condition of a level diagram, the apparatus of the present invention was such as shown in FIG. 3 and the conventional apparatus was held in the state of cutting off the regenerated signal by setting the attenuation of the attenuator 18 in FIG. 3 to infinity. When the carrier frequency of the supervisory signal is in a 2 MHz band, the SN ratio by the receiving apparatus of the present invention is improved about 17 dB (50 times) as compared with the SN ratio by the conventional apparatus. This clearly indicates the effectiveness of the present invention.

INDUSTRIAL APPLICABILITY

As described above, the supervisory signal receiving method and apparatus of the present invention removes the main signal component, which can be a noise component, from the low-level supervisory signal and enables permits the supervisory signal to be received with a high SN ratio, and hence permits implementation of a stable and reliable supervising feature.

Thus, the supervisory signal receiving method and apparatus of the present invention is widely applicable as means for receiving a repeater supervisory signal of an optical communication system which is superimposed on the main signal for transmission; hence, the invention is of great utility in practical use.

What we claim is:

1. A supervisory signal receiving method for a repeater supervisory signal transmitting system, in which a repeater supervisory signal of an optical amplifying repeating system is superimposed on a main optical signal and transmitted to an end office, said method comprising:

converting the main optical signal by a photodetector into an electric signal, and branching the electric signal into a first signal path and a second signal path;

performing equalizing amplification, timing extraction and discriminating regeneration of a non-regenerated main signal included in one signal branched to the first signal path and of the other signal branched to the second signal path;

performing equalization processing, delay amount adjustment and amplitude adjustment in the first signal path and the second signal path to match in waveform, phase position and amplitude between the extracted components of the main signal;

combining output signals from the first signal path and the second signal path;

obtaining a correlation coefficient between a signal of the second signal path, subjected to said equalization processing and said delay amount adjustment, and a signal of the second signal path, subjected to said combining; and controlling said amplitude adjustment in the second signal path in accordance with the polarity and intensity of said correlation coefficient to minimize the extracted components of said main signal in the combined output, thereby extracting said supervisory signal.

2. A supervisory signal receiving apparatus, comprising:

a photodetector for receiving an optical signal having a supervisory signal superimposed on a main signal and for converting said optical signal to an electrical signal;

an amplifier for amplifying the electric signal output from said photodetector;

an electric signal brancher for branching the output from said amplifier into first and second branch signals;

a first filter for frequency equalizing a main signal component contained in said first branch signal to waveform shape said main signal;

a first phase shifter connected to the output of said first filter, for adjusting the phase of said main signal component;

a first attenuator connected to the output of said first phase shifter, for adjusting the amplitude of said main signal component;

an equalizing amplifier for amplifying said second branch signal and for waveform shaping said main signal contained in said second branch signal;

a timing extracting circuit for extracting a pulse repetition frequency component or a timing signal of said main signal from the output of said equalizing amplifier;

a discriminating and regenerating circuit for determining whether said main signal is a "1" or "0" on the basis of the output from said equalizing amplifier and for regenerating said main signal by said timing signal from said timing extracting circuit;

a second filter connected to the output of said discriminating and regenerating circuit, for equalizing frequency components of said regenerated signal to shape its waveform;

a second phase shifter for adjusting the phase of said main signal component contained in the output from said second filter;

a second attenuator for adjusting the amplitude of said main signal component contained in the output from said second phase shifter;

a differential combiner for differentially combining the outputs from said first and second attenuators;

a band-pass filter for extracting said supervisory signal from the output of said differential combiner;

a multiplier for multiplying the outputs from said second phase shifter and said differential combiner;

an integrator for integrating the output from said multiplier; and a control circuit for controlling the attenuation of said second attenuator on the basis of the output from said integrator.

3. A supervisory signal receiving apparatus, comprising:

a photodetector for receiving an optical signal having a supervisory signal superimposed on a main signal and for converting said optical signal to an electric signal;

an amplifier for amplifying the electric signal output from said photodetector;

an electric signal brancher for branching the output from said amplifier into first and second branch signals;

a first filter for frequency equalizing a main signal component contained in said first branch signal to waveform shape said main signal;

a first phase shifter connected to the output of said first filter, for adjusting the phase of said main signal component;

a first attenuator connected to the output of said first phase shifter, for adjusting the amplitude of said main signal component;

an equalizing amplifier for amplifying said second branch signal and for waveform shaping said main signal contained in said second branch signal;

a timing extracting circuit for extracting the pulse repetition frequency component or a timing signal of said main signal from the output of said equalizing amplifier;

a discriminating and regenerating circuit for determining whether said main signal is a "1" or "0" on the basis of the output from said equalizing amplifier and for regenerating said main signal by said timing signal from said timing extracting circuit;

a second filter which receives a polarity-inverted regenerated signal of the output from said discriminating and regenerating circuit and equalizes frequency components of said regenerated main signal to shape the waveform of said regenerated signal;

a second phase shifter for adjusting the phase of said main signal component contained in the output from said second filter;

a second attenuator for adjusting the amplitude of said main signal component contained in the output from said second phase shifter;

a combiner for combining the outputs from said first and second attenuators;

a band-pass filter for extracting a supervisory signal from the output of said combiner;

a multiplier for multiplying the outputs from said second phase shifter and said combiner;

an integrator for integrating the output from said multiplier; and a control circuit for controlling the attenuation of said second attenuator on the basis of the output from said integrator.

* * * * *